United States Patent
Gardner et al.

(10) Patent No.: US 10,090,666 B2
(45) Date of Patent: Oct. 2, 2018

(54) CIRCUIT ARCHITECTURES FOR PROTECTING AGAINST PODL WIRE FAULTS

(71) Applicant: Linear Technology Corporation, Milpitas, CA (US)

(72) Inventors: Andrew J. Gardner, Santa Barbara, CA (US); Jeffrey L. Heath, Santa Barbara, CA (US); David Dwelley, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 386 days.

(21) Appl. No.: 14/956,308

(22) Filed: Dec. 1, 2015

(65) Prior Publication Data
US 2016/0156173 A1    Jun. 2, 2016

Related U.S. Application Data

(60) Provisional application No. 62/086,008, filed on Dec. 1, 2014.

(51) Int. Cl.
| | | |
|---|---|---|
| *H02H 3/20* | (2006.01) | |
| *H02H 3/087* | (2006.01) | |
| *H02H 3/06* | (2006.01) | |
| *H02H 11/00* | (2006.01) | |

(52) U.S. Cl.
CPC ............ *H02H 3/202* (2013.01); *H02H 3/207* (2013.01); *H02H 3/06* (2013.01); *H02H 11/002* (2013.01)

(58) Field of Classification Search
CPC ........ H02H 3/202; H02H 3/087; H02H 3/207; H02H 3/06; H02H 11/002
See application file for complete search history.

(56) References Cited

U.S. PATENT DOCUMENTS

| | | | | |
|---|---|---|---|---|
| 5,198,957 A | * | 3/1993 | Welty | ........................ H02H 3/20 361/111 |
| 2006/0166706 A1 | | 7/2006 | Dwelley et al. | |
| 2007/0170909 A1 | * | 7/2007 | Vorenkamp | ............. G06F 1/266 324/76.11 |
| 2007/0260904 A1 | | 11/2007 | Camagna et al. | |
| 2007/0296391 A1 | * | 12/2007 | Bertin | ................ G01R 19/0092 323/303 |

(Continued)

FOREIGN PATENT DOCUMENTS

| | | |
|---|---|---|
| JP | 2010-263730 A | 11/2010 |
| WO | 2006099613 A2 | 9/2006 |

OTHER PUBLICATIONS

EP Application No. 16002547.4, "Extended European Search Report", dated Apr. 24, 2017, 8 pages.

*Primary Examiner* — Zeev V Kitov
(74) *Attorney, Agent, or Firm* — Patent Law Group LLP; Brian D. Ogonowsky (57) ABSTRACT

In one embodiment, a PoDL system includes a PSE that uses high side and low side circuit breakers that uncouple the PSE voltage source from the wire pair in the event that a fault is detected. Faults may include a temporary short to ground, or to a battery voltage, or between the wires. The breakers perform an automatic retry operation in the event the fault has been removed. The voltages on the wires in the wire pair may be monitored to determine whether the voltages are within a normal range or indicative of a fault condition. Other embodiments are disclosed.

13 Claims, 5 Drawing Sheets

(56) References Cited

U.S. PATENT DOCUMENTS

| | | |
|---|---|---|
| 2010/0287399 A1 | 11/2010 | Yasuda |
| 2014/0313792 A1* | 10/2014 | Nate ................. H02M 3/33523 363/21.15 |
| 2015/0058652 A1* | 2/2015 | Dawley ..................... G06F 1/30 713/340 |
| 2015/0333935 A1 | 11/2015 | Gardner et al. |

* cited by examiner

CIRCUIT ARCHITECTURES FOR PROTECTING AGAINST PODL WIRE FAULTS

CROSS-REFERENCE TO RELATED APPLICATIONS

This application claims priority to U.S. provisional application Ser. No. 62/086,008, filed Dec. 1, 2014, by Andrew J. Gardner et al., assigned to the present assignee and incorporated herein by reference.

FIELD OF THE INVENTION

This invention relates to Power over Data Lines (PoDL) systems, where power from a Power Sourcing Equipment (PSE) is transmitted to a Powered Device (PD) over a single wire pair that is also used for conducting differential data signals, typically Ethernet signals. The invention particularly relates to detecting a PoDL wire fault, such as a momentary short to ground, or to a battery voltage, or between the wires, and automatically resuming normal operation after the fault is removed.

BACKGROUND

It is known to transmit Power over Data Lines to remote power equipment. Power over Ethernet (PoE) is an example of one such system. In PoE, limited power is transmitted to Ethernet-connected equipment (e.g., VoIP telephones, WLAN transmitters, security cameras, etc.) from an Ethernet switch. DC power from the switch is transmitted over two or more twisted wire pairs in the standard CAT-n cabling. One or more of the wire pairs also transmit differential data signals, since the DC common mode voltage does not affect the data. In this way, the need for providing any external power source for the Powered Devices (PDs) can be eliminated.

A newer technology is Power over Data Lines (PoDL) where power is transmitted over a single, twisted wire pair along with the differential data. As of the date of this disclosure, the IEEE is in the process of developing a standard for PoDL as IEEE 802.3bu. PoDL may be more flexible than PoE and, since it requires just one wire pair, is likely to become a popular technique, especially in automobiles.

In the example of using PoDL in automobiles, there may be a temporary short to ground, or to a battery voltage, or between the wires due to automobile vibrations or other causes. During the short, the PoDL or Ethernet communications may be interrupted. Without any protection circuitry, the short may destroy the PoDL components, result in excessive heat being generated, or disable an important feature of the automobile.

What is needed is a circuit architecture to detect such faults to suspend operation of the PoDL system and then quickly resume normal operation if the fault is removed.

SUMMARY

In one embodiment, a PoDL system includes a PSE that uses high side and low side circuit breakers that uncouple the PSE voltage source from the wire pair in the event that a fault is detected. The breakers perform an automatic retry operation in the event the fault has been removed. The voltages on the wires in the wire pair may be monitored to determine whether the voltages are within a normal range or indicative of a fault condition.

Other embodiments are disclosed.

BRIEF DESCRIPTION OF THE DRAWINGS

Elements that are the same or equivalent in the various figures are labeled with the same numeral.

DETAILED DESCRIPTION

Various PoDL systems are described that include circuitry for detecting a fault between the PSE and PD. The PoDL system is protected from the fault using circuit breakers that uncouple the PSE voltage source from the wire pair. An automatic retry routine tests the system to determine if the fault has been removed and, if so, the system resumes normal operation.

Conventional aspects of a PoDL will first be described with respect to FIG. 1.

Figure 1:
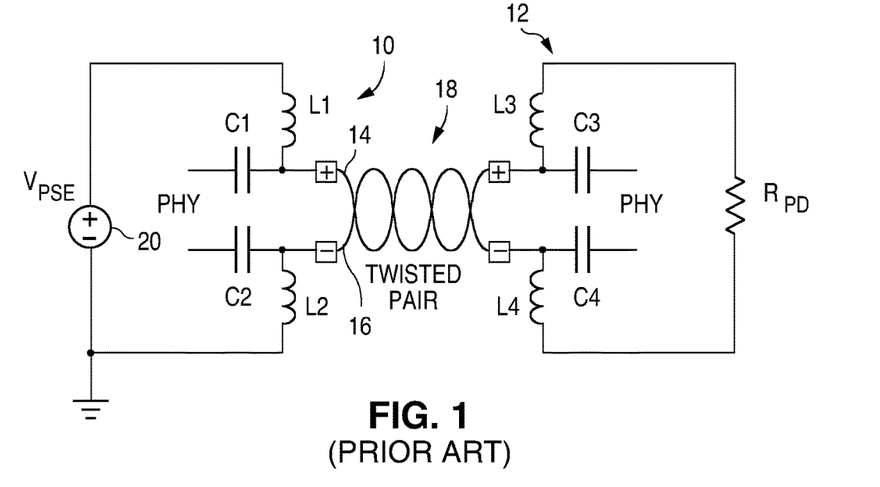
FIG. 1 illustrates a conventional PoDL system.

FIG. 1 illustrates the pertinent portion of a PSE 10 and a PD 12 connected via a first wire 14 and a second wire 16 in a twisted wire pair 18.

A coupling/decoupling network comprises capacitors C1-C4 and inductors L1-L4. The relatively high frequency Ethernet differential data is passed by the capacitors C1-C4 while the inductors L1-L4 block the data signals. The Ethernet transceivers are referred to as PHYs, which are the physical layers in the data path. The data is processed by conventional equipment not shown in the figures.

The PoDL DC voltage that powers the PD 12 is generated by a PSE voltage source 20 generating the voltage $V_{PSE}$. The DC voltage is coupled to the wire pair 18 by the inductors L1 and L2, and the DC voltage is coupled to the PD load, represented by the resistor $R_{PD}$, via the decoupling inductors L3 and L4. The capacitors C1-C4 block the DC voltage.

Typically, in a PoDL system, a low power detection and classification routine is initially performed after powering up that detects whether the PD is PoDL-compatible and conveys the power requirements of the PD. This low power routine will be referred to as handshaking and is described in the IEEE standards for PoDL. Such a routine may be carried out by a state machine, a processor, or other known circuits. After a successful handshaking, power switches (not shown) between the PSE voltage source 20 and the twisted wire pair 18 are closed. The present invention relates to scenarios where a fault occurs that is not detected during the handshaking routine, such as occurring after the full PSE voltage has been supplied to the PD. Therefore, the aspects of the PoDL system relating to the handshaking are not relevant to the present invention and are not described in detail.

Examples of a fault that may occur after the PoDL system has been operational include:

Wire pair 18 plus-conductor and/or minus-conductor shorted to ground.

Wire pair 18 plus-conductor and/or minus-conductor shorted to the automobile battery voltage.

Wire pair 18 plus-conductor shorted to minus-conductor.

Wire pair 18 plus-conductor and/or minus-conductor shorted to a negative voltage, e.g. −5V.

The automobile battery voltage may or may not be at a different potential than the PSE voltage source 20. Upon removal of the wire fault, normal operation should resume with minimal delay.

The PoDL circuits shown in FIGS. 2-7 respond to the aforementioned fault conditions.

Figure 2:
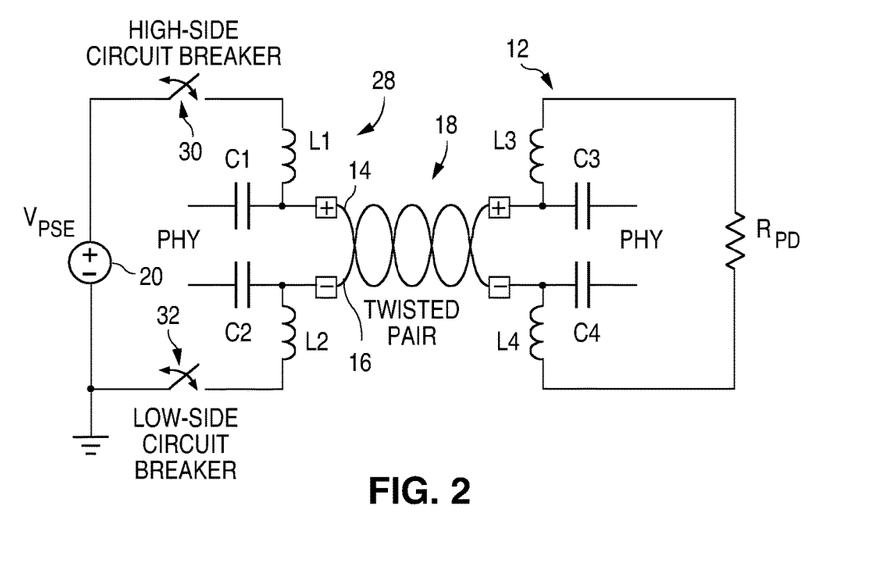
FIG. 2 illustrates a PoDL system implementing one embodiment of the present invention.

In FIG. 2, the PD 12 may be the same as in FIG. 1 and conventional. The inventive circuitry is located in the PSE 28.

A controller for detecting the fault conditions is not shown in FIG. 2, but is shown in FIGS. 3, 4, 6, and 7.

In FIG. 2, a high-side circuit breaker 30 and a low-side circuit breaker 32 in the PSE 28 are used to protect the circuit. The breakers 30 and 32 are opened by the controller when a fault is detected. The breakers 30 and 32 must tolerate either positive or negative voltages across their terminals when open.

The breakers 30 and 32 are also controlled by the controller to be periodically closed after the initial fault is detected as an automatic retry feature with sufficiently low duty-cycle in order to restore functionality with minimal delay upon removal of a wire fault. No handshaking needs to be done after a successful retry operation.

The PD 12 is intentionally isolated from ground in FIG. 2, where the only connection to the PSE 28 is through the wire pair 18. Without ground isolation, additional high-side and low-side circuit breakers may be required at the PD 12.

Figure 3:
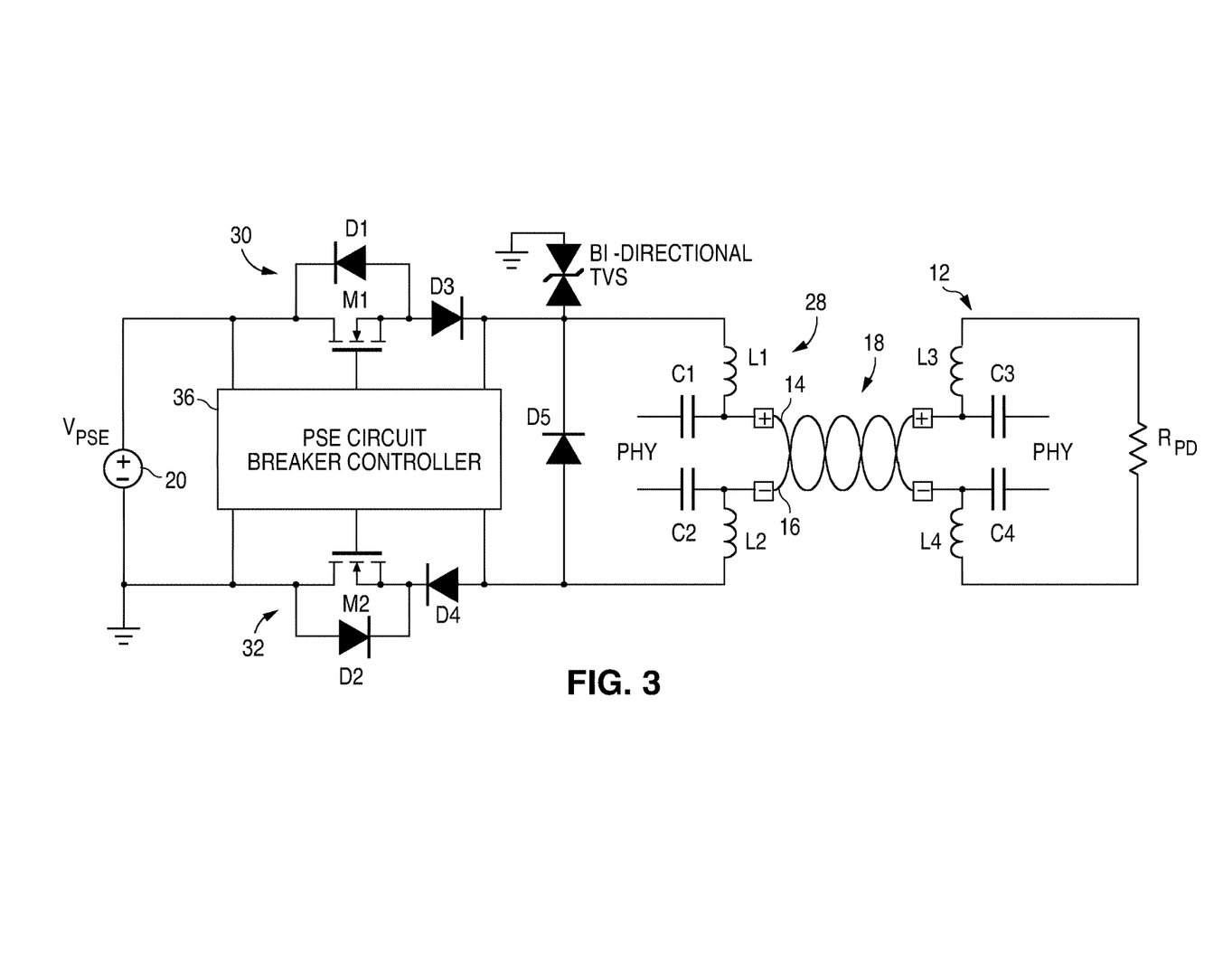
FIG. 3 illustrates one embodiment of the PoDL system of FIG. 2 in greater detail.

FIG. 3 illustrates the high-side circuit breaker 30 as an N-channel MOSFET switch M1 placed in series with a diode D3 in the opposite polarity to the body diode (shown as diode D1) of the MOSFET switch M1. The resulting composite circuit breaker 30 is able to tolerate voltages of either positive or negative polarity when the MOSFET switch M1 is off.

Similarly, the low-side circuit breaker 32 is an N-channel MOSFET switch M2 placed in series with a diode D4 in the opposite polarity to the body diode (shown as diode D2) of the MOSFET switch M2. The resulting composite circuit breaker 32 is able to tolerate voltages of either positive or negative polarity when the MOSFET switch M2 is off.

Diodes D3 and D4 only conduct when the voltage polarity is correct (positive voltage on wire 14 and ground voltage on wire 16). For example, if one of the wires 14/16 is shorted to the automobile battery voltage to create a reverse polarity situation, the diodes D3 and D4 will protect the PSE voltage source 20.

A steering diode D5 and bidirectional transient voltage suppressor TVS may be required in order to limit voltage excursions resulting from energy stored in inductors L1-L4 subsequent to a circuit breaker trip.

One disadvantage of the circuit of FIG. 3 is a reduction in voltage at the PD 12 due to the forward junction voltages of diodes D3 and D4.

The PSE circuit breaker controller 36 is coupled to monitor the voltage levels on the wires 14 and 16 to determine whether they are within the normal range and controls the circuit breakers 30 and 32 to open if the voltage levels are outside of the normal range, indicating a fault. The type of fault may also be determined by the particular measured voltage on the wires 14/16 and reported.

Figure 4:
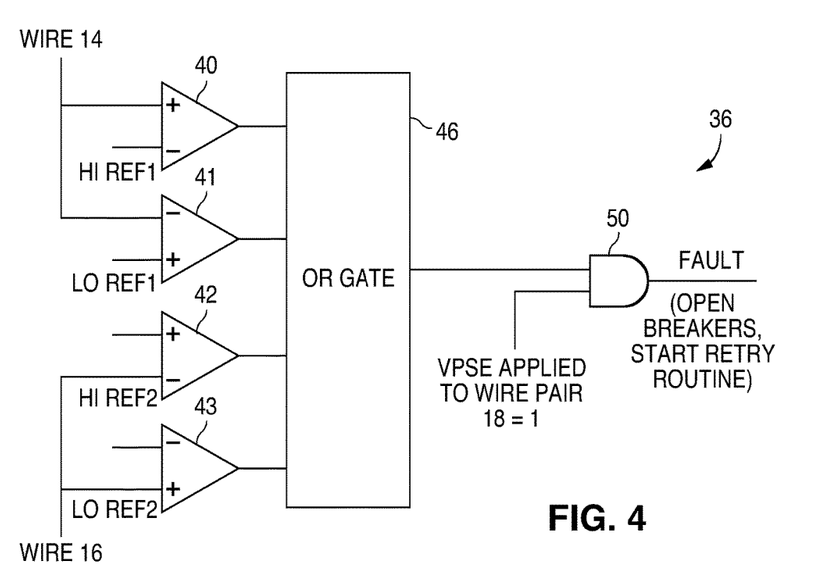
FIG. 4 illustrates possible circuitry in the controller of FIG. 3.

FIG. 4 illustrates some possible circuitry within the controller 36. Comparators 40 and 41 are coupled to the wire 14 to determine if the voltage on the wire 14 is between a high reference voltage Hi ref1 and a low reference voltage Lo ref1. Similarly, comparators 42 and 43 are coupled to the wire 16 to determine if the voltage on the wire 16 is between a high reference voltage Hi ref2 and a low reference voltage Lo ref2. The high and low reference voltages are different for the wires 14 and 16, since wire 14 is intended to be at a positive voltage and the wire 16 is intended to be at ground during normal operation.

Further, the voltage difference between the wires 14 and 16 can be detected by the controller 36 using a differential amplifier, where the output of the differential amplifier is compared to a high threshold and a low threshold. Exceeding the high threshold may indicate that one of the wires is shorted to a battery terminal. Going below the low threshold may indicate that the wires are shorted to each other. In either case, a fault signal is generated. Between the threshold is the normal PSE voltage source 20 voltage.

The controller 36 also detects that the PSE voltage source 20 is connected to the wires 14/16 (downstream from any power switches that are closed after a successful handshaking routine). This identifies that the PoDL circuit is supposed to be operating normally, where the PD 12 is supposed to be powered by the PSE voltage source 20.

If there is any wire fault where the wire 14 and/or 16 is shorted to ground, or a battery terminal, or to each other, at least one of the comparators 40-43 will output a logical 1. Thus, the OR gate 46 will also output a logical 1. The signal on line 48 is a logical high if the controller 36 detects that the voltage source 20 is coupled across the wires 14/16. If both inputs into the AND gate 50 are high, the AND gate 50 outputs a logical 1, signaling a fault condition. The controller 36 then turns off the MOSFET switches M1 and M2 to uncouple the PSE voltage source 20 from the wires 14/16.

Note that the conventional power switches (not shown), upstream from the controller 36, that initially coupled the voltage source 20 to the wire pair 18 after a successful handshaking will typically still be closed. Further, the circuit breakers 30 and 32 may be independent from any conventional overcurrent detection circuitry that may cause the power switches (not shown) to be opened when the current exceeds the IEEE standard for a maximum current.

The controller 36 then carries out a retry routine, such as via a processor, a state machine, or other logic circuit. The retry routine periodically closes the MOSFET switches M1 and M2, such as for 0.5-1 second while measuring the voltages on the wires 14 and 16 to determine whether the fault has been removed. If the fault has not been removed after, for example, three tries, the MOSFET switches M1 and M2 remain off until the system is reset and the fault is cleared.

In another embodiment, the PoDL system further detects a current through each of the wires 14/16, such as by measuring the voltage drop across a low value sense resistor in series with each wire, and the measured current (corresponding to the voltage drop) is compared to a threshold current to determine if there is a fault. For example, if the wires 14/16 were shorted to each other, the measured current would be high and indicate a fault. In most cases, an overcurrent fault can be sensed by detecting that the voltage on a wire is outside of the normal range using the circuitry of FIG. 4.

Figure 5:
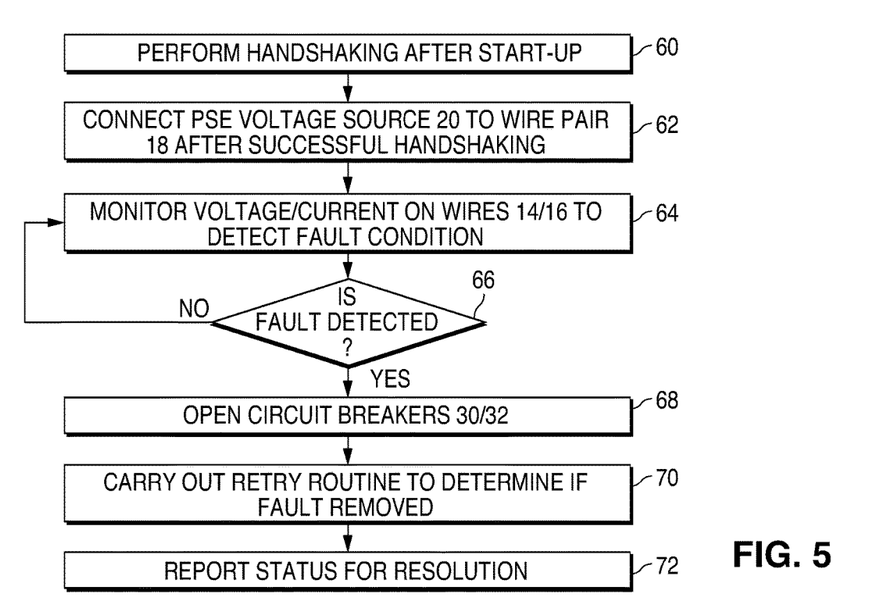
FIG. 5 is a flowchart identifying steps performed by the circuit of FIG. 3.

FIG. 5 is a flowchart summarizing the above-described operation.

In step 60, a conventional handshaking is performed after powering up the PoDL system to determine whether the PSE 28 should couple the PSE voltage source 20 to the wire pair 18 by closing power switches (not shown) upstream from the controller 36.

In step 62, the PSE voltage source 20 is coupled to the wire pair 18 via the power switches (not shown) and the initially-closed MOSFET switches M1 and M2.

In step 64, the controller 36 detects that the PSE voltage source 20 is coupled to the wires 14/16 and monitors the voltages on the wires 14/16 to determine whether a fault condition exists.

In step 66, if a fault condition is detected, the controller 36 turns off the MOSFET switches M1 and M2 (i.e., opens the circuit breakers 30 and 32) to prevent damage to the system and prevent erroneous Ethernet data from affecting the operation of the automobile.

In step 70, a retry routine is carried out to periodically turn on the MOSFET switches M1 and M2 for a short duration, sufficient to avoid damage to the system, while monitoring the voltages on the wires 14/16 to see if the fault has cleared. After the fault is detected for a few cycles, the MOSFET switches M1 and M2 remain off and the fault status is reported for resolution (step 72).

Figure 6:
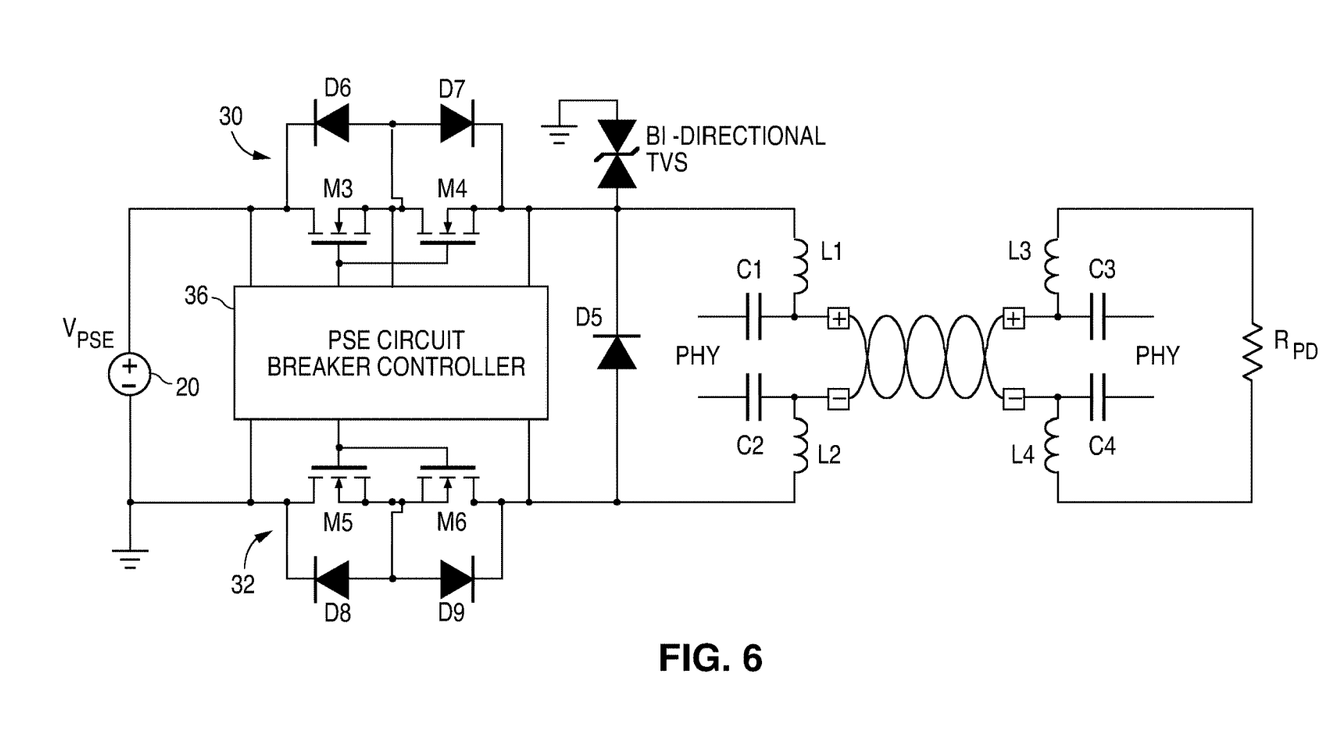
FIG. 6 illustrates another embodiment of the PoDL system of FIG. 2.

FIG. 6 illustrates another example of a fault-protected PoDL circuit where N-channel MOSFET switches M3 and M4 are connected in series, back-to-back, such that their body diodes oppose, to realize an isolated high side circuit breaker 30. Similarly, N-channel MOSFET switches M5 and M6 are connected in series, back-to-back, such that their body diodes oppose, to realize an isolated low side circuit breaker 32. The controller 36 may be the same as previously described and turns the series MOSFET switches off simultaneously if there is a fault. This circuit implementation does not suffer from the loss in PD voltage headroom that occurred in FIG. 3 due to the blocking diodes D3 and D4 in FIG. 3. Additional configurations of N-channel and P-channel MOSFETs are possible in order to realize an isolated breaker.

Figure 7:
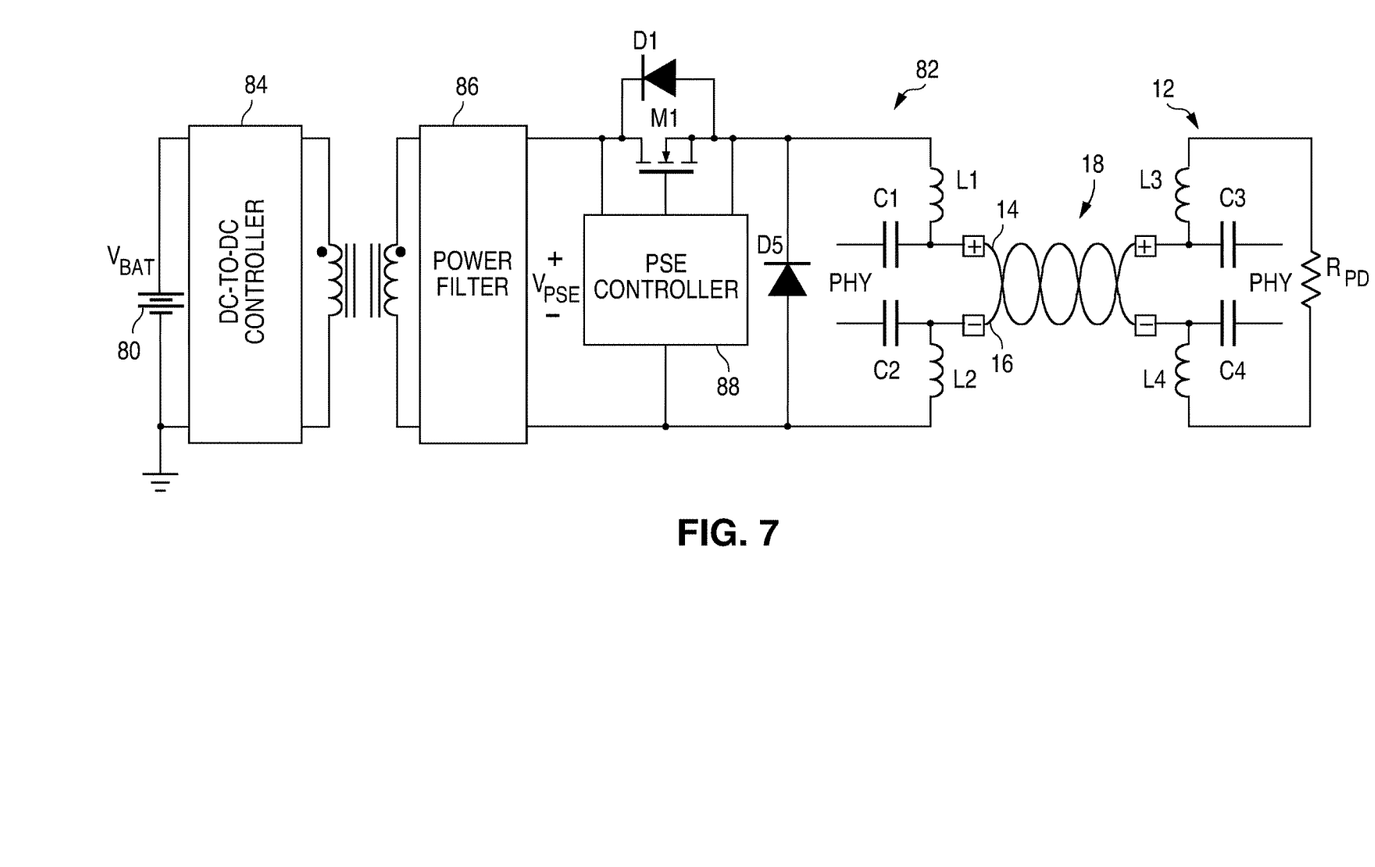
FIG. 7 illustrates an embodiment of a transformer-isolated PoDL system where only one circuit breaker is needed.

FIG. 7 illustrates an alternative approach for realizing a wire fault-protected PoDL circuit. A voltage from a battery 80 in the PSE 82 is regulated by a transformer-isolated DC-DC converter 84, which generates the PSE voltage for transmission to the PD 12 via the wire pair 18. The regulated voltage is filtered by a power filter 86, which may be a capacitor. By using a fully isolated DC/DC converter 84 at the PSE 82, it is possible to dispense with one of the circuit breakers (the low side breaker in the example) while still providing protection during wire faults. An additional advantage of the isolated DC/DC converter PSE architecture is the ability to deliver power without interruption during a short of either wire 14/16 in the wire pair 18 (but not both) to the battery 80 voltage $V_{bat}$ or ground. The PSE controller 88 operates similarly to the controller 36 previously described to turn off the MOSFET switch M1 in the event a fault is detected.

While particular embodiments of the present invention have been shown and described, it will be obvious to those skilled in the art that changes and modifications may be made without departing from this invention in its broader aspects and, therefore, the appended claims are to encompass within their scope all such changes and modifications.

What is claimed is:

1. A Power over Data Lines (PoDL) system comprising:
   Power Sourcing Equipment (PSE) configured for coupling to a Powered Device (PD) via a wire pair, comprising a first wire and a second wire, wherein differential data signals and DC power are conducted over the same wire pair;
   a controller configured to detect a voltage on the first wire, after the DC power is initially coupled to the wire pair, and compare the voltage on the first wire to a first upper threshold limit and a first lower threshold limit for the first wire to determine whether a wiring fault condition exists with respect to the first wire;
   the controller also configured to detect a voltage on the second wire, after the DC power is initially coupled to the wire pair, and compare the voltage on the second wire to a second upper threshold limit and a second lower threshold limit for the second wire to determine whether a wiring fault condition exists with respect to the second wire;
   a first switch in series with the first wire, controlled by the controller,
   wherein the controller opens at least the first switch when the fault condition is detected with respect to the first wire; and
   a second switch in series with the second wire, controlled by the controller,
   wherein the controller opens at least the second switch when the fault condition is detected with respect to the second wire.

2. The system of claim 1 further comprising a second switch in series with the second wire, controlled by the controller, wherein the controller also opens the second switch when the fault condition is detected.

3. The system of claim 1 wherein the fault condition comprises at least one of a short of the first wire or the second wire to ground, a short of the first wire or the second wire to an external battery voltage, or a short between the first wire and the second wire.

4. The system of claim 1 wherein the controller detects a voltage on at least one of the first wire or second wire and compares the voltage to an acceptable range of voltages to determine whether the fault condition exists.

5. The system of claim 1 wherein the controller detects a current through at least one of the first wire or second wire and compares the current to a threshold current level to determine whether the fault condition exists.

6. The system of claim 1 wherein the first switch comprises a MOSFET connected in series with a diode connected in an opposite polarity to a body diode of the MOSFET.

7. The system of claim 1 further comprising a second switch in series with the second wire, controlled by the controller, wherein the controller also opens the second switch when the fault condition is detected,
   wherein the first switch and the second switch each comprise back-to-back, series connected MOSFETs with opposing body diodes.

8. The system of claim 1 wherein the controller is configured to open the first switch when a voltage across the wire pair exceeds a predetermined threshold voltage.

9. The system of claim 1 wherein the controller is configured to open the first switch when a voltage across the wire pair goes below a predetermined threshold voltage.

10. The system of claim 1 where the wire pair is the only DC conductive path between the PSE and PD.

11. The system of claim 1 wherein the PSE further comprises:
   a DC voltage source; and
   a transformer-isolated DC/DC converter coupled to the DC voltage source for generating the DC power to the PD, such that the PD and the first switch are DC isolated from the DC voltage source and DC/DC converter.

12. The system of claim 1 wherein the first switch is a high side switch.

13. The system of claim 1 wherein the controller is configured to carry out a retry routine by closing the first switch to detect whether the fault condition has been removed.

* * * * *